United States Patent
Murphy

(10) Patent No.: US 9,803,258 B2
(45) Date of Patent: Oct. 31, 2017

(54) POST PROCESSING OF COMPONENTS THAT ARE LASER PEENED

(75) Inventor: David S. Murphy, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 1101 days.

(21) Appl. No.: 13/584,257

(22) Filed: Aug. 13, 2012

(65) Prior Publication Data
US 2014/0041224 A1 Feb. 13, 2014

(51) Int. Cl.
| B23P 15/02 | (2006.01) |
| C21D 10/00 | (2006.01) |
| B23K 26/00 | (2014.01) |
| F01D 5/28 | (2006.01) |
| B24B 19/14 | (2006.01) |
| B24C 1/00 | (2006.01) |
| B23P 9/00 | (2006.01) |

(52) U.S. Cl.
CPC ........ C21D 10/005 (2013.01); B23K 26/0069 (2013.01); B24B 19/14 (2013.01); B24C 1/00 (2013.01); F01D 5/286 (2013.01); B23P 9/00 (2013.01); B23P 15/02 (2013.01); Y10T 29/49336 (2015.01)

(58) Field of Classification Search
CPC ......... C21D 10/005; B24B 19/14; B24C 1/00; F01D 5/286; B23K 26/0069; B23P 9/00; B23P 15/02; Y10T 29/49336
USPC ..... 29/889.1, 889.23, 889.7, 402.04, 402.05, 29/402.06, 557, 558
See application file for complete search history.

(56) References Cited

U.S. PATENT DOCUMENTS

| 4,454,740 | A | | 6/1984 | Neal et al. |
| 4,732,312 | A | | 3/1988 | Kennedy et al. |
| 5,373,983 | A | * | 12/1994 | Stenard et al. ................. 228/57 |
| 5,591,009 | A | | 1/1997 | Mannava et al. |
| 5,744,781 | A | | 4/1998 | Yeaton |
| 6,143,095 | A | | 11/2000 | Kim et al. |
| 6,238,187 | B1 | | 5/2001 | Dulaney et al. |
| 6,339,878 | B1 | | 1/2002 | Owen et al. |
| 6,852,179 | B1 | | 2/2005 | Toller et al. |
| 7,776,165 | B1 | | 8/2010 | Dulaney et al. |
| 2005/0211343 | A1 | | 9/2005 | Toller et al. |
| 2006/0009857 | A1 | | 1/2006 | Gibbs et al. |

(Continued)

FOREIGN PATENT DOCUMENTS

| CN | 101457322 A | 6/2009 |
| CN | 102335789 A | 2/2012 |
| JP | 4873087 B2 | 2/2012 |

OTHER PUBLICATIONS

International Search Report and Written Opinion for International Application No. PCT/US2013/053685 dated Apr. 21, 2014.

(Continued)

Primary Examiner — Ryan J Walters
(74) Attorney, Agent, or Firm — Carlson, Gaskey & Olds, PC

(57) ABSTRACT

A method of post processing a laser peened component to remove a laser remelt layer is proposed. The post processing includes a series of steps including grit blasting, chemical etching and mechanical finishing the component. This will ensure that the mechanical property (i.e., damage tolerance) benefit of laser peening is restored to the surface of the component.

4 Claims, 5 Drawing Sheets

(56) References Cited

U.S. PATENT DOCUMENTS

| | | |
|---|---|---|
| 2009/0314758 A1 | 12/2009 | Ganesh |
| 2010/0136296 A1 | 6/2010 | Collins et al. |
| 2010/0249926 A1 | 9/2010 | Kirschman et al. |
| 2011/0005493 A1 | 1/2011 | Hirano et al. |

OTHER PUBLICATIONS

International Preliminary Report on Patentability for PCT Application No. PCT/US2013/053685 dated Feb. 26, 2015.
European Search Report for European Application No. 13848323.5 dated Oct. 16, 2015.

* cited by examiner

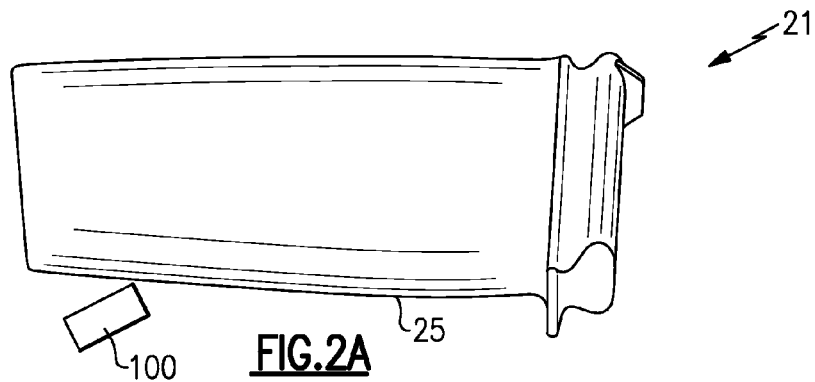
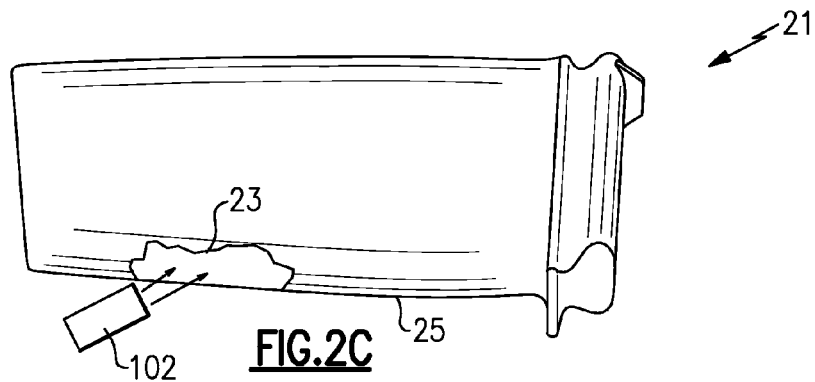
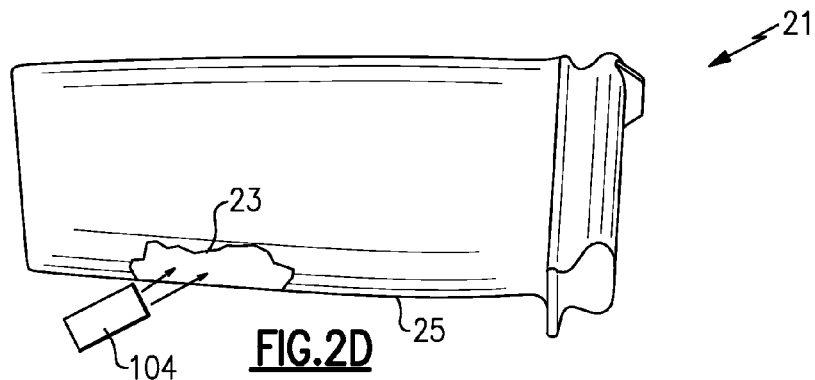
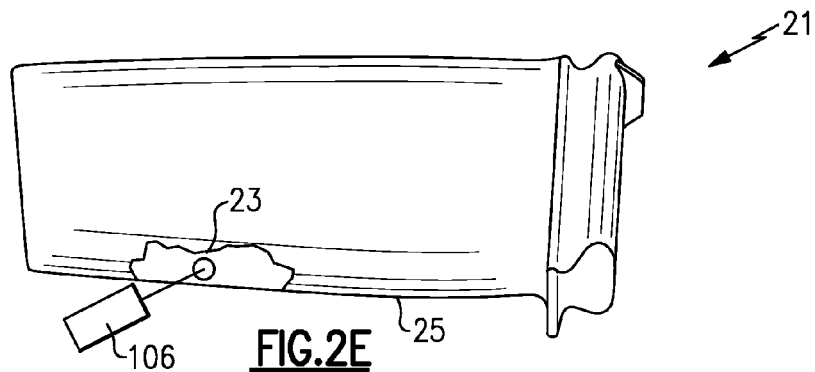

POST PROCESSING OF COMPONENTS THAT ARE LASER PEENED

STATEMENT REGARDING FEDERALLY SPONSORED RESEARCH OR DEVELOPMENT

This invention was made with government support under Contract No. F33657-99-D-2051 awarded by the United States Air Force. The Government has certain rights in this invention.

BACKGROUND OF THE INVENTION

This application relates to post processing of laser peened articles.

Laser peening is a surface treatment that induces deep compressive residual stresses. The compression increases the damage tolerance of a metal material. One method of laser peening an article is to prepare the material by covering it with a sacrificial ablative layer. Typically, this ablative layer is an applied medium, such as tape or paint to avoid base metal damage of the component during laser peening.

A medium, typically water, covers the ablative layer and acts to confine the plasma that will develop after the laser strike. A laser pulse is directed at the material. When the laser hits the material, an explosion of expanding plasma is formed between the ablative layer and the water layer. This explosion of plasma creates a shock wave that compresses and works the outer layer of the material.

Another method of laser peening a material is to use the surface of the base metal itself as an ablative medium. A portion of the base material is used to create the plasma that produces the shock wave, subsequently damaging the base material surface. An example of such damage is micro-cracking, as well as detrimental tensile residual stress. This damaged material is known as a remelt layer.

Post processing to remove the remelt layer and finish the component surface has been proposed.

SUMMARY OF THE INVENTION

In a featured embodiment, a method of finishing and removing a laser remelt layer of a component generated by a laser peening process includes the steps of: a) grit blasting a surface at a remelt layer; b) chemically etching the surface; and c) mechanically finishing the surface.

In another embodiment according to the previous embodiment, chemically etching the surface is performed after grit blasting a surface at a remelt layer.

In another embodiment according to any of the previous embodiments, mechanically finishing the surface is performed after chemically etching the surface.

In another embodiment according to any of the previous embodiments, the depth of the laser re-melt layer removed across steps a)-c) is less than 1 mil (0.0254 mm) per side.

In another embodiment according to any of the previous embodiments, the laser re-melt layer is on a portion of a turbine engine component.

In another embodiment according to any of the previous embodiments, the component includes an airfoil.

In another embodiment according to any of the previous embodiments, the component is a blade.

In another embodiment according to any of the previous embodiments, the component is a vane.

In another embodiment according to any of the previous embodiments, the component is a shaft.

In another embodiment according to any of the previous embodiments, the component is a disk.

In another featured embodiment, a method of manufacturing a gas turbine component having an airfoil includes the steps of: a) laser shock peening a base metal surface of the component; b) then grit blasting the surface; c) then chemically etching the surface after the grit blasting; and then mechanically finishing the surface after the chemical etching.

In another embodiment according to the previous embodiment, the depth of the laser re-melt layer removed is less than 1 mil (0.0254 mm) per side.

In another embodiment according to any of the previous embodiments, the component is a vane.

In another embodiment according to any of the previous embodiments, the component is a blade.

These and other features of this application will be best understood from the following specification and drawings, the following of which is a brief description.

BRIEF DESCRIPTION OF THE DRAWINGS

FIG. 2A illustrates a perspective view of an embodiment of a turbine airfoil of the engine shown in FIG. 1;
FIG. 2C illustrates the turbine airfoil being grit blasted;
FIG. 2D illustrates the turbine airfoil being chemically etched;
FIG. 2E illustrates the turbine airfoil being mechanically finished.

DETAILED DESCRIPTION

Figure 1:
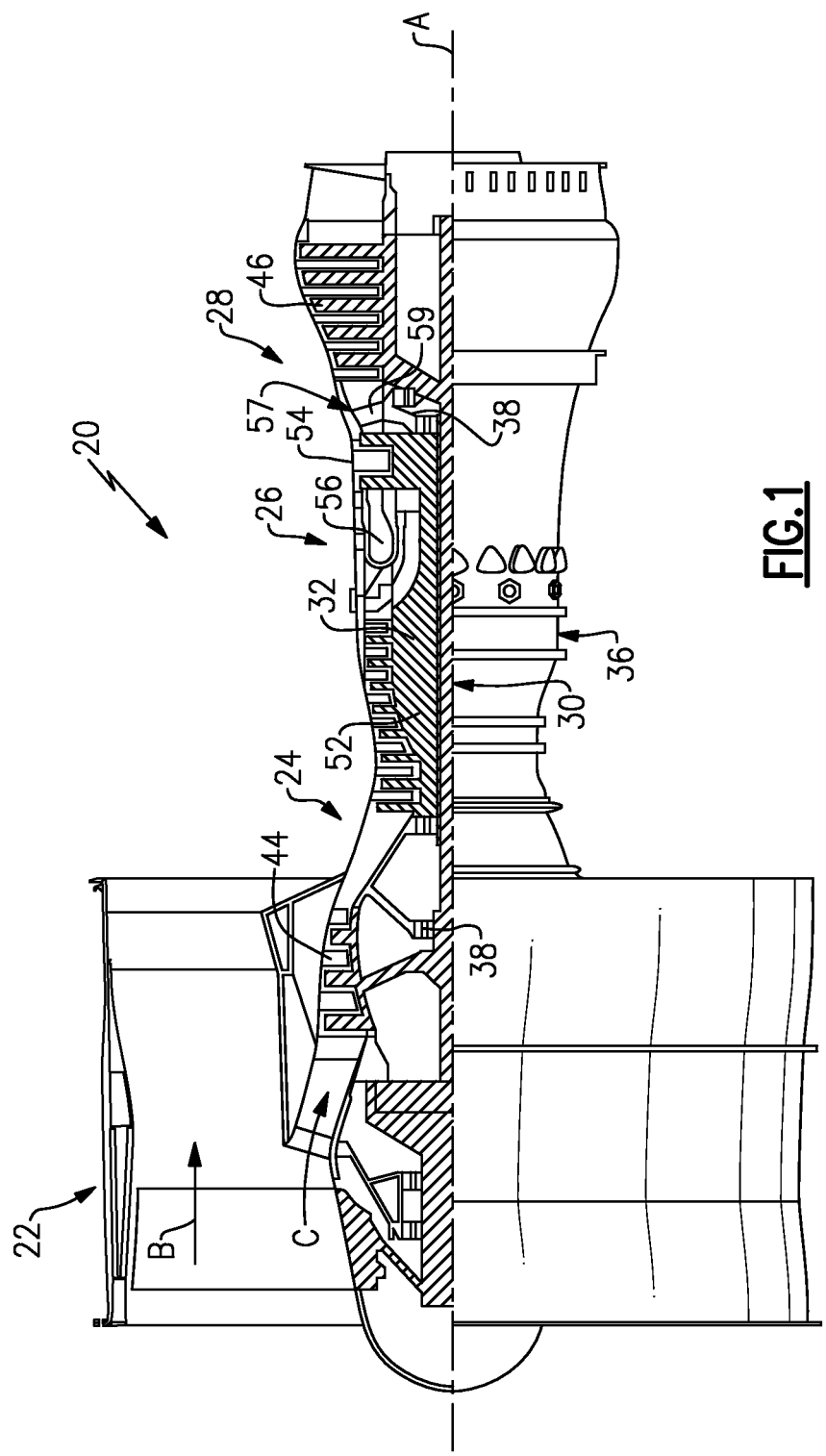
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

FIG. 2A schematically shows a base metal surface 25 of an engine blade airfoil 21 for use in gas turbine engine 20. The airfoil 21 may be a turbine or compressor blade or vane. The surface 25 is being laser peened using a laser peening system 100. The laser peening of base metal surface 25 is not sequenced with an ablative medium.

Figure 2B:
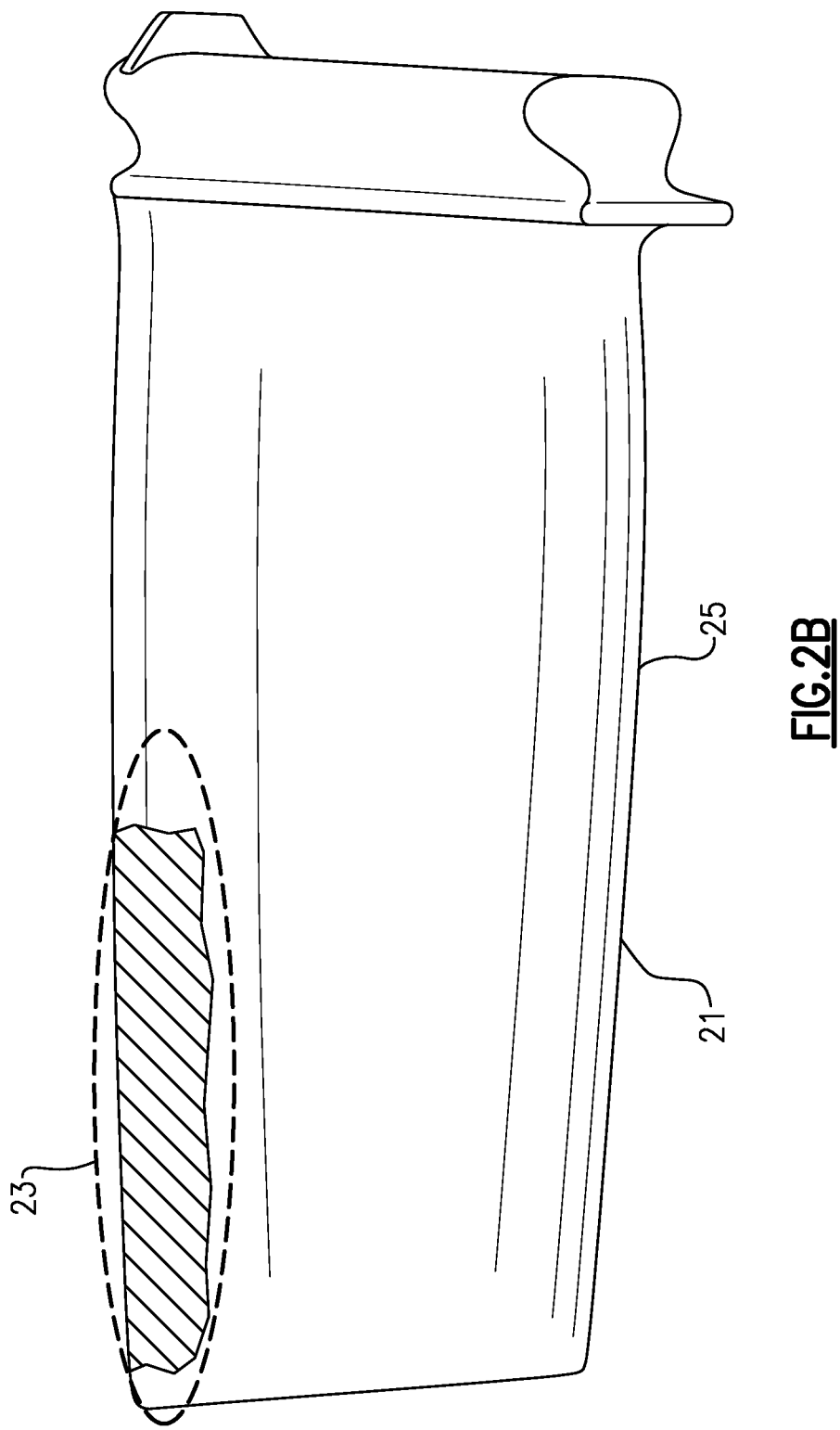
FIG. 2B illustrates the turbine airfoil being laser peened.
Figure 3:
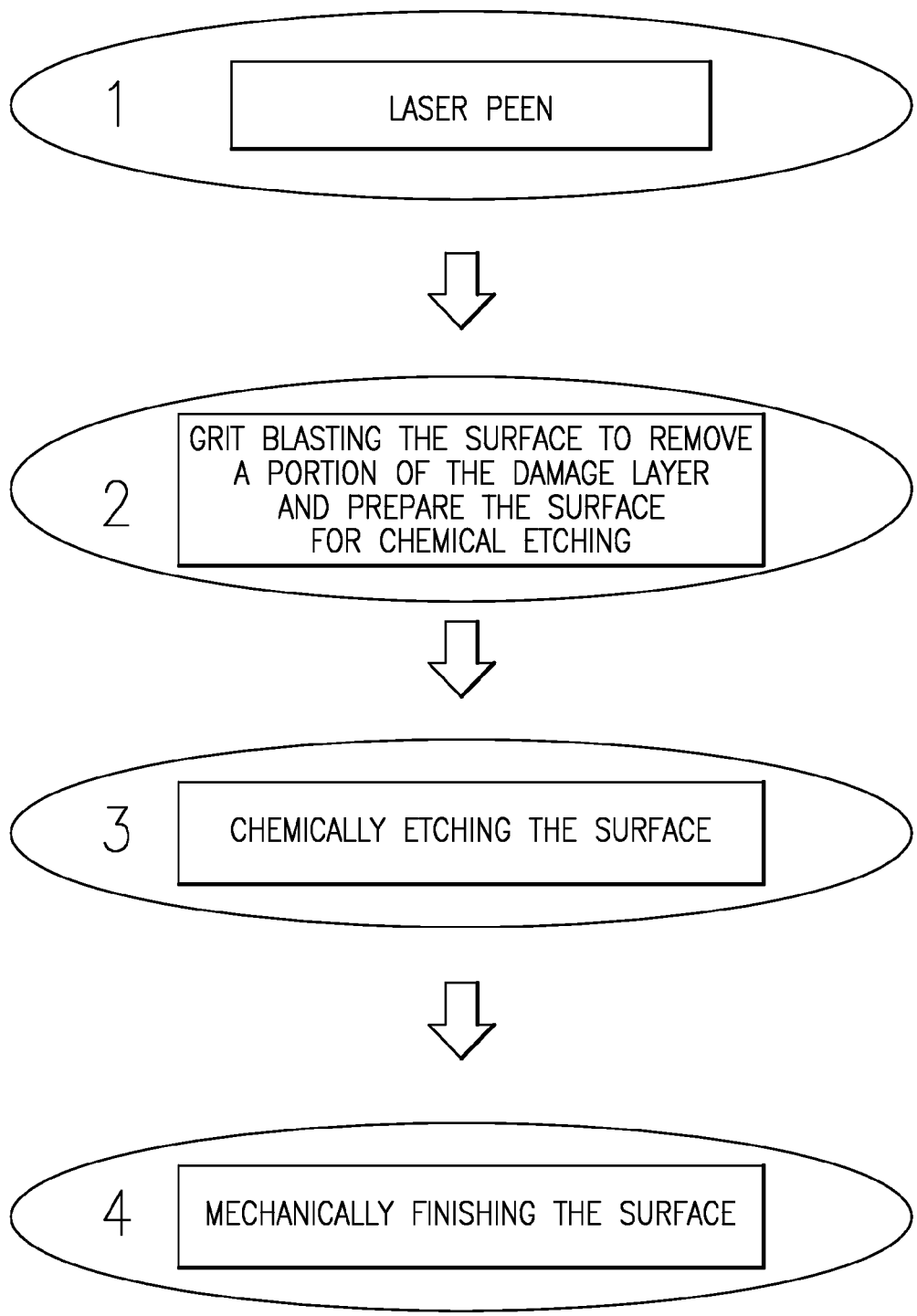
FIG. 3 is a flowchart for a finishing process.

FIG. 2B shows an engine blade airfoil 21 that has been laser peened. A laser remelt layer 23 results due to the creation of plasma with a portion of the base metal surface 25 in direct contact with the laser. It should be understood that the remelt layer 23 may extend over a greater surface than is illustrated.

Figure 4:
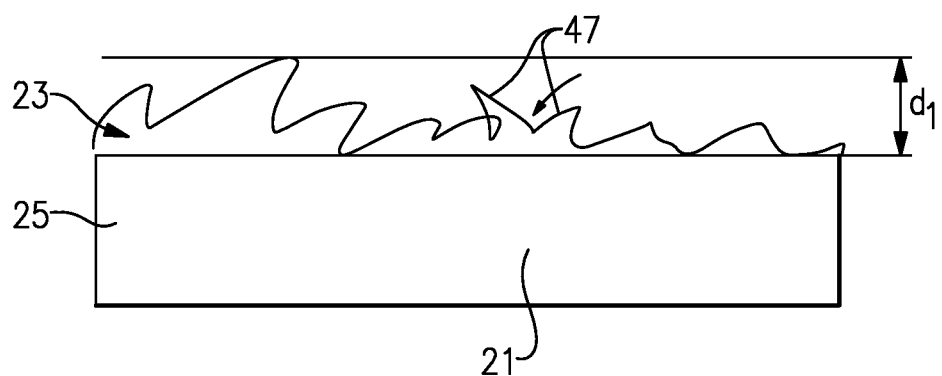
FIG. 4 illustrates a before view of a turbine airfoil prior to the step illustrated in FIG. 2C.

FIG. 4 schematically illustrates a magnified view of the laser remelt layer 23 of the engine blade airfoil 21 post laser peening. The laser remelt layer 23 has a damaged area 47. This damaged area 47 may be brittle and/or micro-cracked.

As will be described below, the laser remelt layer 23 will undergo a removal and finishing method at the damaged area 47 to improve the condition of the base metal surface 25. As illustrated, the damage area 47 is over a small thickness shown as $d_1$. In practice, $d_1$ may be less than 1 mil (0.0254 mm).

Referring to FIG. 2C, a grit blasting tool 102, shown schematically, is used to grit blast the remelt layer 23. This is the first step used to remove the laser remelt layer 23 and prepare the surface 25 for chemical etching. By usage of known process controls, the grit blasting tool 102 can target a specific depth of the damaged area 47 on the engine blade airfoil 21 for removal.

The airfoil 21 is next subjected to a chemical removal process 104, as shown schematically in FIG. 2D. The chemical removal process 104 etches the base metal surface 25 and removes some or all of the damaged area 47, depending on the process parameters utilized.

The base metal surface 25 of an airfoil 21 is then finished using a mechanical removal operation 106, as shown schematically in FIG. 2E. The mechanical removal process may be similar to those in media finishing techniques. Medial finishing techniques are known to workers of ordinary skill in this art. The finishing process parameters and controls ensure full removal of the remelt layer 23 while also removing any surface attack that might have resulted from the chemical etching process.

In one example, the specific depth of the damaged area 47 removed across steps 2C-2E is less than 1 mil (0.0254 mm) total per side of the base metal surface 25.

Figure 5:
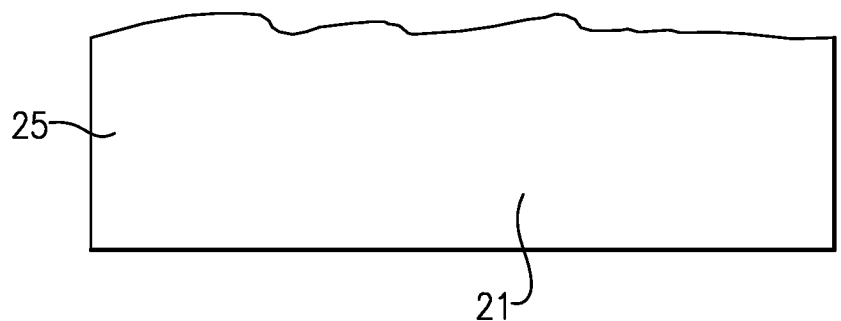
FIG. 5 schematically illustrates a view of the turbine airfoil shown in FIG. 4 after step 2E.

Post processing of the above described of the base metal surface 25 removes the damaged area 47. FIG. 5 schematically shows an area similar to that shown in FIG. 4, after processing.

While this disclosure is specifically directed to airfoils, other components such as vanes, disks, shafts, etc. . . . may benefit from this invention.

Although an embodiment of this invention has been disclosed, a worker of ordinary skill in this art would recognize that certain modifications would come within the scope of this invention. For that reason, the following claims should be studied to determine the true scope and content of this invention. In addition, this invention is not limited to application to gas turbine airfoils, though this article was used for illustration purposes.

The invention claimed is:

1. A method of manufacturing a gas turbine component having an airfoil comprising:
   a) laser shock peening a base metal surface of the component;
   b) then grit blasting the surface;
   c) then chemically etching the surface after the grit blasting; and
   d) then mechanically finishing the surface after the chemical etching.

2. The method of claim 1, wherein the component has sides, and a depth of a laser re-melt layer removed is less than 1 mil (0.0254 mm) per side.

3. The method of claim 1, wherein the component is a vane.

4. The method of claim 1, wherein the component is a blade.

* * * * *